United States Patent [19]

Sumida et al.

[11] Patent Number: 4,671,564
[45] Date of Patent: Jun. 9, 1987

[54] VENTILATING DEVICE FOR A ROOF OPENING OF VEHICLES

[75] Inventors: Koji Sumida, Hiroshima; Takeshi Kawasaki, Higashi-Hiroshima, both of Japan

[73] Assignee: Webasto-Werk W. Baier GmbH & Co., Gauting, Fed. Rep. of Germany

[21] Appl. No.: 687,379

[22] Filed: Dec. 28, 1984

[30] Foreign Application Priority Data

Dec. 28, 1983 [JP] Japan ................................ 58-200820

[51] Int. Cl.4 .................... B60R 13/02; B60J 7/05; B60J 7/057
[52] U.S. Cl. .................................. 296/214; 296/221; 296/223; 49/65
[58] Field of Search ........ 296/211, 216, 217, 220–223, 296/214; 49/63, 65

[56] References Cited

U.S. PATENT DOCUMENTS

| 2,973,991 | 3/1961 | Werner | 296/223 |
| 3,888,165 | 6/1975 | Hattass et al. | 296/107 |
| 3,960,404 | 6/1976 | Bienert | 296/221 X |
| 4,175,784 | 11/1979 | Schatzler et al. | 296/222 |
| 4,179,156 | 12/1979 | Huisman | 296/216 |
| 4,274,672 | 6/1981 | Kuroda | 296/220 |
| 4,320,921 | 3/1982 | Schatzler | 296/213 |
| 4,364,601 | 12/1982 | Katayama et al. | 296/221 |
| 4,422,687 | 12/1983 | Kaltz et al. | 296/221 |

FOREIGN PATENT DOCUMENTS

| 1230683 | 12/1966 | Fed. Rep. of Germany | 296/222 |
| 2254962 | 6/1974 | Fed. Rep. of Germany | |
| 3105717 | 9/1982 | Fed. Rep. of Germany | |
| 3248413 | 7/1983 | Fed. Rep. of Germany | 296/211 |
| 3338372 | 4/1984 | Fed. Rep. of Germany | 296/211 |
| 2094723 | 9/1982 | United Kingdom | 296/221 |

Primary Examiner—Robert B. Reeves
Assistant Examiner—Dennis H. Pedder
Attorney, Agent, or Firm—Sixbey, Friedman & Leedom

[57] ABSTRACT

A ventilating device for a roof opening of the type having a cover mounted for closing the roof opening, a cable drive arrangement for displacing the cover from a position closing the roof opening to positions for opening the roof opening by sliding movement and for opening the roof opening by tilting movement, and a sunshade panel displaceable mounted for opening and closing a roof frame aperture located below the roof opening. At least a portion of the sunshade panel is automatically displaced to a position partially opening the aperture when the cover is shifted to a tilted-up position via drive cables of the cover cable drive. The sunshade panel is also displaceable to positions opening the aperture independent of the cover position.

22 Claims, 14 Drawing Figures

VENTILATING DEVICE FOR A ROOF OPENING OF VEHICLES

BACKGROUND OF THE INVENTION

The present invention relates to ventilating devices for a roof opening of a motor vehicle, such as vehicle sunroofs. In particular, the present invention relates to the types of such ventilating devices having a cover mounted for longitudinal displacement for opening or closing the roof opening and also for pivoting to vent the interior, which are also provided with a panel that underlies the roof opening and is finished as a liner for matching with the vehicle interior.

Covers of the above-noted type are known, for example, from U.S. Pat. No. 4,179,156 and German Offenlegungsschrifts Nos. 31 05 717 and 2 254 962. In the case of the first two mentioned prior art devices, the liner panel is provided with a vent aperture and a flap is hinged to the liner panel for opening and closing the vent aperture when the roof cover is in its positions opening and closing the roof opening. However, these arrangements require a cam groove and link interconnection in between the closure flap and the roof cover for carrying out of the opening movement of the closure flap, when the cover is tilted upwardly, and require an arrangement for securing the flap in its closed position. Such constructions not only complicate and increase the cost of the ventilating device but also preclude the liner panel from being manually opened, a feature that is particularly desirable when the cover is transparent or translucent and the liner panel serves as a sunshade, in order to increase the amount of visibility through the cover, both in its upwardly tilted and closed positions.

The arrangement of Offenlegungsschrift No. 2,254,962, while simpler than those of the precedingly described devices, in that the liner panel is merely linked to the underside of the cover and has no flap arrangements whose movements must be controlled, the device of this prior publication is also incapable of variable manual displacement of the liner panel relative to the cover for the roof opening.

Accordingly, it is a principal object of the present invention to provide a ventilation device for an opening formed in the roof of a vehicle of the type having an upwardly tiltable cover for the roof opening and a panel means, such as a sunshade/liner panel, wherein the panel means may be caused to partially open the aperture when the cover is in its tilted-up position in a simple and effective manner.

In keeping with the object of the preceding paragraph, it is a further object of the present invention to enable the noted partial opening of the aperture when the cover is in its tilted-up position to be achieved without necessitating any direct linkage between the panel means and the cover, or cam guide means; particularly, an arragement whereby the drive cables, themselves, are operatively associated with the panel means in a manner causing the aperture to be partially open when the cover is in its tilted-up position.

These objects are achieved, in accordance with a preferred embodiments of a device for a roof opening of a vehicle in accordance with the present invention, having a pair of guide rails provided at opposite sides of the roof opening, a cover mounted on the guide rails by slide members and slidingly movable forward or backward for opening or closing the roof opening, drive means for slidingly moving the slide members through the action of a pair of drive cables, a tilting assembly provided between the cover and the slide members and operable by the sliding movement of the slide members to shift the cover from a position closing the roof opening to a tilted-up position by tilting the cover up about its front portion, a frame provided under the roof, and an aperture formed in the frame under the roof opening that is openable or closable by panel means, the drive cables being operatively associated with the panel means to partially open the aperture when the cover is in its tilted-up position, such as by engagement of entrainment means positioned on the panel means by an end portion of the drive cables when the cover is displaced from the closing position to the tilted-up position.

In accordance with a first embodiment, the entrainment means are formed by foremost ones of auxiliary slide members upon which the panel means are slidably displaceable, while in modified embodiments the panel means are provided with a plurality of vents and closure means, by which the vents are openable and closable, that are coupled to the entrainment means. In one such modified arrangement, the entrainment means is a lever swingably mounted upon the panel that is coupled to closure means comprised of a plurality of closures that are pivotably connected to the panel means. In another form, the plurality of closures for the vent openings of the panel means are slidably displaceable and the entrainment means comprises a link having a front end operating portion that is positioned in opposition to free ends of the drive cables. In either case, return spring means are provided for biasing the lever or link to a position causing the closures to close the vent openings in the panel means.

These and further objects, features and advantages of the present invention will become more obvious from the following description when taken in connection with the accompanying drawings which show, for purposes of illustration only, several embodiments in accordance with the present invention.

BRIEF DESCRIPTION OF THE DRAWINGS

FIGS. 12 and 13 show a second embodiment in accordance with the present invention wherein FIG. 12 is a fragmentary longitudinal side section and FIG. 13 is a view showing the portion indicated by the arrow "F" in FIG. 12.

DETAILED DESCRIPTION OF THE PREFERRED EMBODIMENTS

Figure 1:
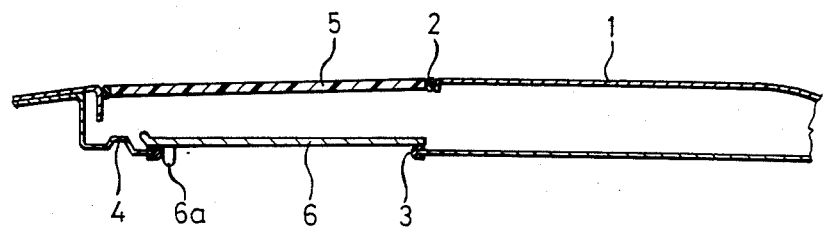
FIGS. 1–4 are schematic diagrams showing the operation of the ventilation device in accordance with the present invention.
Figure 2:
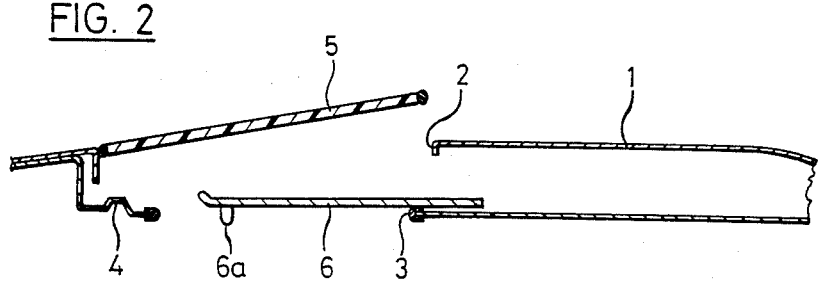
Figure 3:
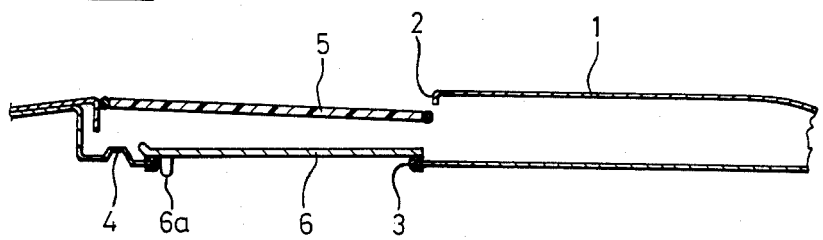

With reference to FIGS. 1–11, a first embodiment of the present invention will be descirbed below in detail which is designed for uses in roof openings of vehicles. Referring to FIGS. 1–9, a vehicle roof 1 is formed with a rectangular opening 2 in a front portion thereof. Provided under the roof 1 is a frame 4 having an aperture 3 generally conforming to the window opening 2.

A cover 5 for opening or closing the roof opening 2 is made of an opaque material such as metal or resin, or a transparent or semi-transparent material, such as glass or resin, for admitting light.

A sunshade panel 6, for opening or closing the aperture 3, has a knob 6a projecting downward from the laterally middle portion of its front end. Such a panel may be a liner panel matched to the vehicle roof interior lining.

A pair of main guide rails 7 extending longitudinally of the vehicle is provided at opposite side ede portions of the frame 4 defining the aperture 3. A plate-like auxiliary guide rail 8 extends inward from each guide rail 7.

The cover 5 is mounted on each main guide rail 7 by a pair of front and rear main slide members 11, 12 and is slidable forward or rearward. A tilting assembly 13 is provided between the cover 5 and the main slide members 11, 12 for tilting the cover 5, from a roof opening closing position, about the front portion thereof.

A pair of front and rear connecting plates 14, 15 fixed to each side of the cover 5, are formed with longitudinal cam grooves 16, 17, respectively. A pin 18 on the front main slide member 11 is slidably inserted through the cam groove 16 of the front connecting plate 14.

An operating link 19 is supported at one end by a pin 20 on the rear main slide member 12. The other end of the link 19 has a fixed pin 21 slidably inserted through the cam groove 17 of the rear connecting plate 15 and a roller 22 slidable in engagement with the main guide rail 7 and disengageable from the rail 7. The operating link 19 is formed with a cam groove 23 which is open at the other end carrying the pin 21. A roller 24 on the main guide rail 7 is slidably engaged in and disengageable from the cam groove 23.

Drive means 25 for slidingly moving the main slide members 11, 12 forward or backward comprises a motor 26, a coupling mechanism 27, a pair of drive cables 28, etc. The motor 26 and the coupling mechanism 27 are mounted on the frame 4 in front of and adjacent to the aperture 3. The drive cables 28 are driven by the motor 26 through the coupling mechanism 27. Each drive cable 28 is operatively connected at an intermediate portion to the coupling mechanism and has opposite ends inserted through guide pipes 29. The drive cables 28 are each guided, at an end, toward a respective main guide rail 7 and fixed to the corresponding main slide members 11, 12. The other ends, i.e. the free ends, of the drive cables 28 extend to front portions of the auxiliary guide rails 8.

Figure 7:
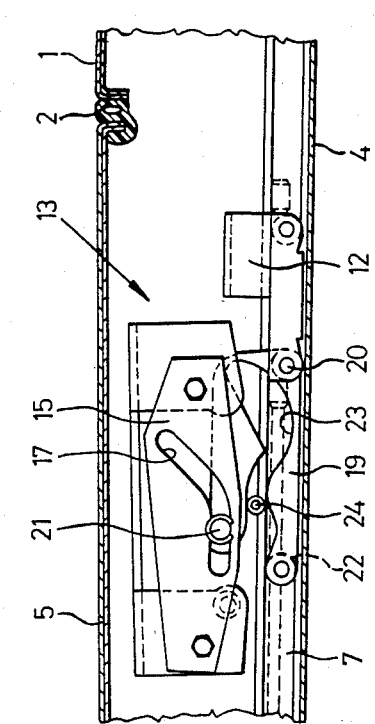
FIGS. 7 and 8 are sectional views taken along the lines VII—VII and VIII—VIII of FIGS. 5 and 6, respectively.
Figure 8:
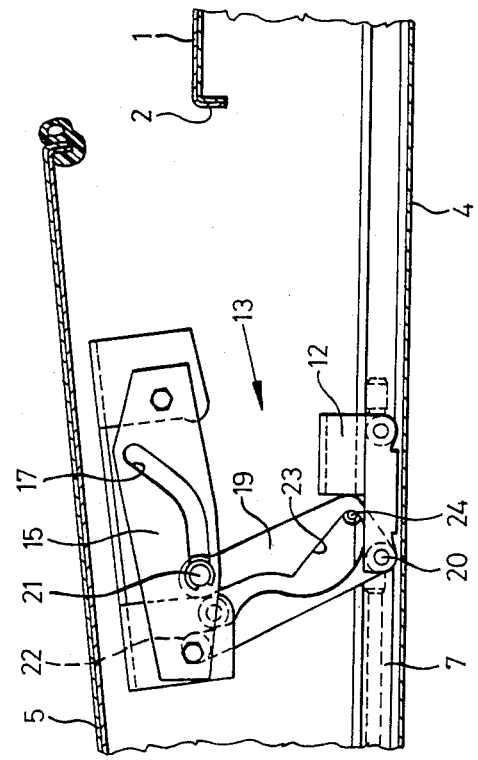
Figure 9:
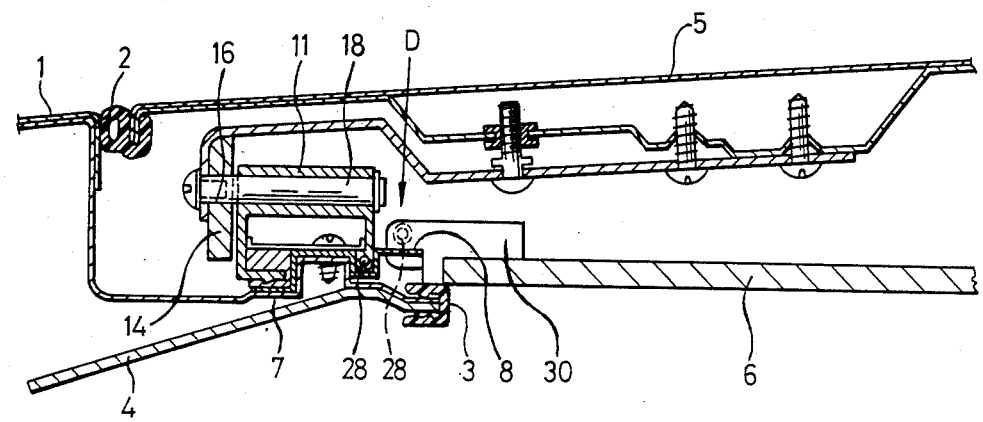
FIG. 9 is a sectional view taken along line IX—IX of FIG. 7.

When the cover 5 is positioned to close the window opening 2, as seen in FIGS. 1 and 7, the pins 18, 21 and rollers 24 are positioned in longitudinally intermediate portions of the cam grooves 16, 17 and 23, with the rollers 22 located in the main guide rails 7.

The main slide members 11, 12 are slidable forward or rearward on the main rails 7 by the motor 26 through the coupling mechanism 27 and the drive cables 28. When the main slide members 11, 12 are moved forward with the cover 6 positioned in the closing position, the pins 18 on the front main slide members 11 slide forward within the cam grooves 16 of the front connecting plates 14, the pins 21 on the operating links 19 slide forward within the cam grooves 17 of the rear connecting plates 15, and the rollers 24 slide along the cam grooves 23 of the operating links 19. At the same time, the operating links 19 are pivotally moved upwards about the pins 20, disengaging the rollers 22 on the links 19 from the main guide rails 7, whereby the cover 5 is tilted up about its front portion and brought to a tilted-up position shown in FIGS. 2 and 8.

Alternatively, when the main slide members 11, 12 are slidingly moved rearward with the cover 5 in the tilted-up position, the cover 5 is reversely tilted down about its front portion to the closing position.

Further, if the main slide members 11, 12 are moved rearward when the cover 5 is in the closing position, the pins 18 on the front main slide members 11 slide rearward along the cam grooves 16 of the front connecting plates 14, the pins 21 on the operating links 19 slide rearward within the cam grooves 17 of the rear connecting plates 15, and the rollers 24 move forward relative to the links 19 out of engagement with the came groove 23. At the same time, the links 19 move downward about the pins 20, and the rollers 22 on the links 19 slide rearward along the amin guide rails 7. Consequently the cover 5 is tilted down about its front portion to the position shown in FIG. 3.

Figure 4:
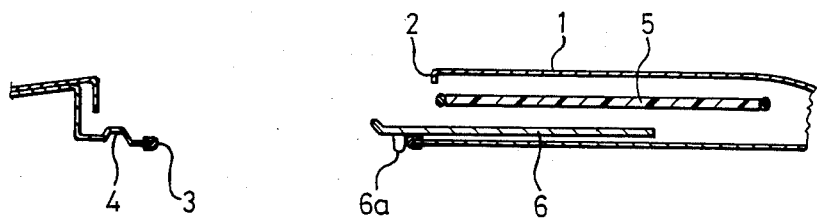

When the main slide members 11, 12 are further moved rearward, the cover 5 moves rearward with the main slide members 11, 12 to an opened position as seen in FIG. 4 to completely open the roof opening 2.

Further if the main slide members 11, 12 are moved forward when the cover 5 is in its opened position, the cover 5 is reversely brought to the closing position.

Figure 10:
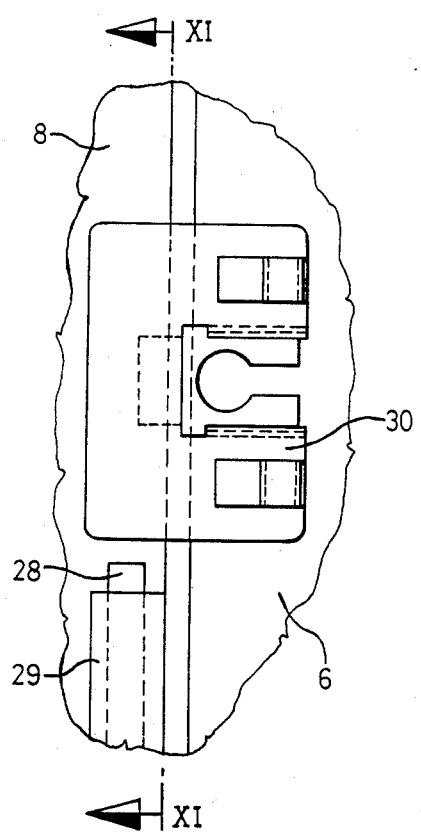
FIG. 10 is a view showing the portion of the ventilating device indicated generally by the arrow "D" in FIG. 9.
Figure 11:
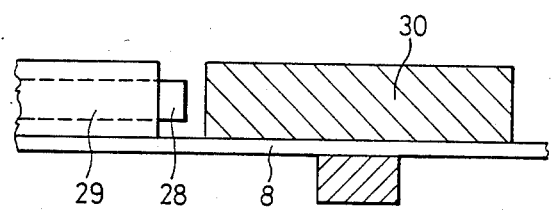
FIG. 11 is a sectional view taken along the line XI—XI of FIG. 10.

As shown also in FIGS. 10 and 11, a plurality of auxiliary slide members 30 are provided at each of opposite sides of the sunshade panel 6. The auxiliary slide members 30 are fittingly mounted on the auxiliary guide rails 8 to render the sunshade panel 6 slidable forward or rearward along the auxiliary guide rails 8.

When the cover 5 and the sunshade panel 6 are in their closed positions, the free ends of the drive cables 28 are positioned in front of and opposed to the foremost auxiliary slide members 30 at opposite sides of the sunshaade panel 6, with a small clearance formed therebetween.

Figure 5:
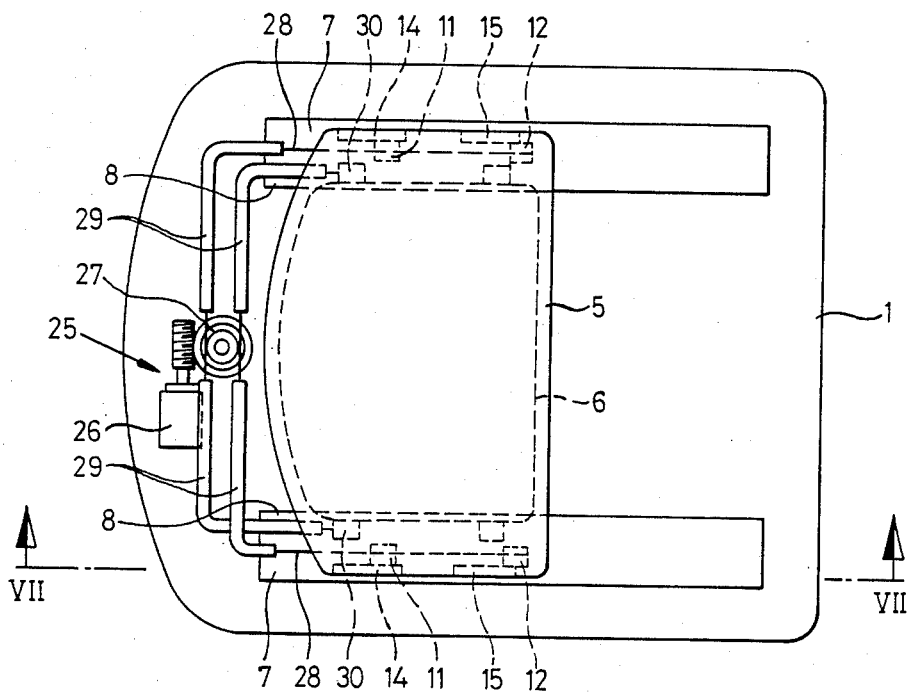
FIGS. 5 and 6 are schematic plan views of a roof in accordance with a first embodiment of the present invention, with the roof in positions corresponding to those shown in FIGS. 1 and 2, respectively.
Figure 6:
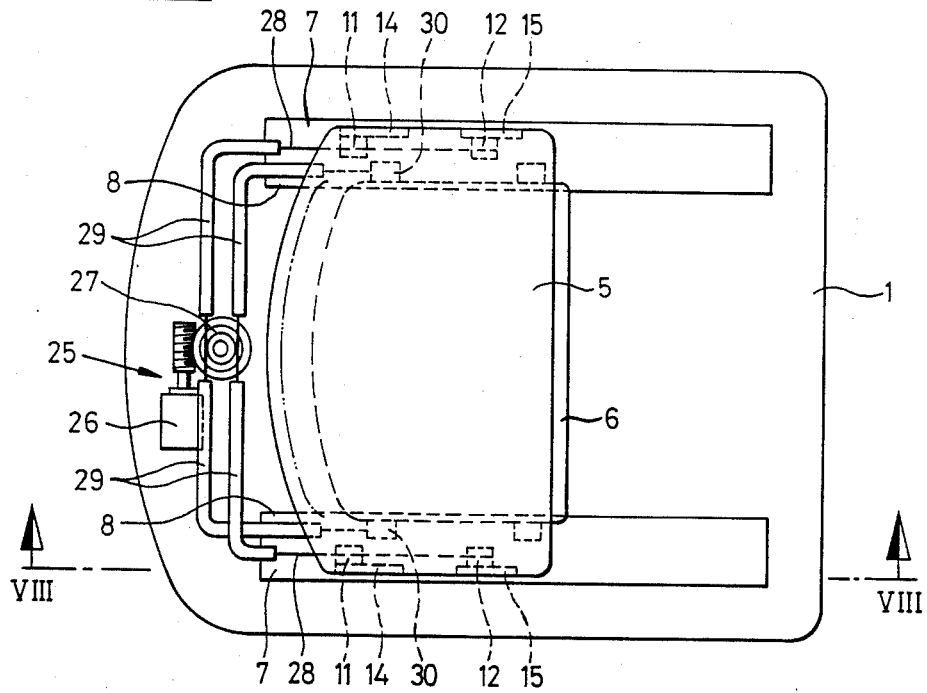

Accordingly if the cover 5 is brought to the tilted-up position by forwardly sliding the main slide members 11, 12 by the motor 26 through the coupling mechanism 27 and the drive cables 28 when the cover 5 and the sunshade panel 6 are in thier closed position shown in FIG. 5, the free ends of the drive cables 28 move rearward and rearwardly push the foremost auxiliary slide members 30 on opposite sides of the sunshade 6. Thus, the entrained auxiliary slide members 30 cause the sunshade panel 6 to automatically move rearward to slightly open the aperture 3 as seen FIG. 6. The rearward ends of the cables 28 are thus rearwardly movable about 40 mm, while the sunshade 6 moves rearward about 35 mm.

Even when the sunshade panel 6 is in its closed position, the interior of the vehicle can be ventilated merely by bringing the cover to the tilted-up position, in this way, without the necessity of separately moving the sunshade panel 6, and hence, is very convenient. Further, because the aperture 3 is opened only slightly, the admission of sunlight into the vehicle does not pose any problem even if the cover 5 is made of a transparent or semi-transparent plate permitting passage of strong sunlight therethrough.

While the cover 5 is in its tilted-up position, the free ends of the drive cables 28 become obstacles, preventing the sunshade panel 6 from being manually moved to its closed position. This indicates that the cover 5 is in the tilted-up position and eliminates the likelihood that the driver forgets to close the roof opening 2 with the cover 5.

The sunshade panel 6 is slidable further rearward when the cover 5 is in the tilted-up position. The sunshade panel 6 can be opened or closed freely when the cover 5 is not in the tilted-up position. Thus, in addition, to the automatic displacement of sunshade panel 6, it may also be displaced to positions opening the aperture 3 independent of the position of cover 5, such as by direct manipulation thereof via knob 6a.

Figure 13:
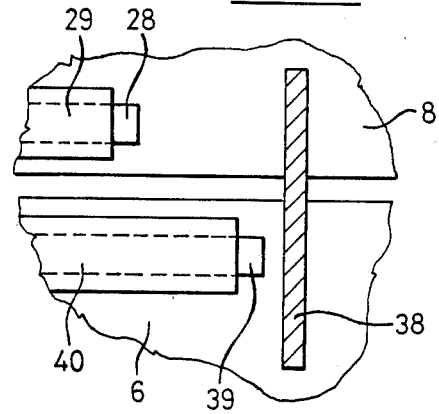
Figure 12:
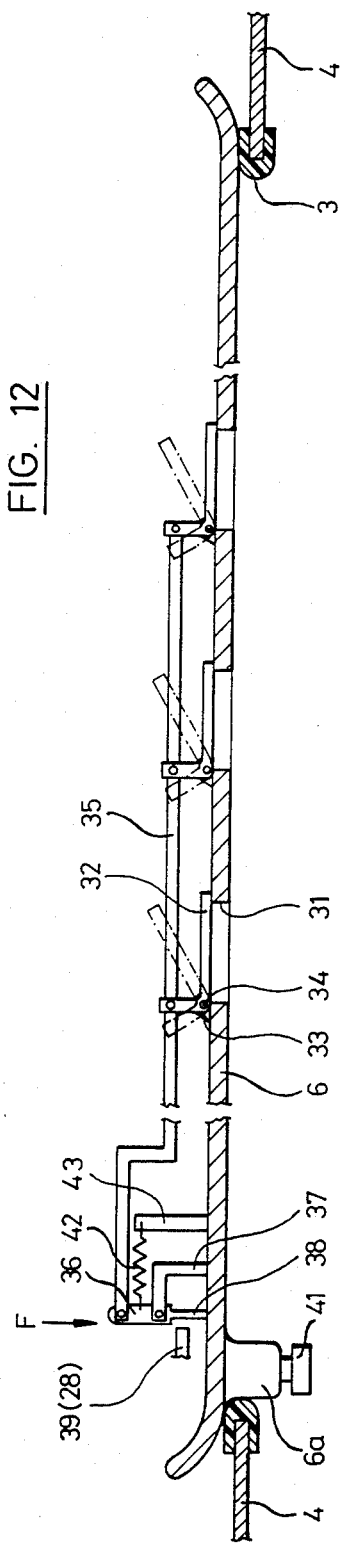

FIGS. 12 and 13 show a second embodiment of the present invention. A sunshade panel 6 is formed in a longitudinally intermediate portion thereof with a plurality of laterally elongated vents 31 arranged side by side longitudinally of the sunshade. A plurality of closures 32 for opening or closing the vents 31 are disposed above the vents 31, are L-shaped and each have an upwardly projecting front end portion. Each closure 32 is rotatably supported, at its front end lower portion, by a laterally extending pin 34 on brackets 33 attached to the sunshade panel 6. The closures 32 are each operatively interconnected, at least at one side of its front end upper portion, by a longitudinally extending link 35. The front end of the link 35 is disposed above one side of the front end of the sunshade panel 6 and is pivoted to the upper end of a vertical lever 36. The vertically middle portion of the lever 36 is supported by a bracket 37 on the sunshade panel 6, the lever 36 being rotatable about a laterally extending pin. The lower end of the lever 36 serves as an operating portion 38 in the form of a plate and extends over the side portion of the sunshade 6 and the auxiliary guide rail 8. On the front side of the operating portion 38, the free end of the drive cable 28 is disposed opposite the operating portion 38.

Additionally, a panel closure drive cable 39 is disposed with an end suitably spaced from the operating portion 38. The closure drive cable 39 is inserted through a guide pipe 40 that is disposed above the sunshade panel 6 and is connected by a coupling, such as by a pinion gear arrangement means (not shown), to a handle 41 that is journaled within the knob 6a of the sunshade panel 6. A tensioned return spring 42 for biasing the closures 32 toward the closing direction is connected between an upper portion of the lever 36 and a bracket 43 on the sunshade panel 6.

With the embodiment described above, the closures 32 are held in contact with the upper surface of the sunshade panel 6 when in closed position. If the cover 5 is tilted up when the cover 5 and the sunshade 6 are in their closed positions, the free end of the drive cable 28 entrains the operating portion 38, pushing it so as to pivotally move the lever 36. This movement moves the link 35 forward, rotating each closure 32 to the opened position indicated in a phantom line in FIG. 12. Thus, the interior of the vehicle can be ventilated through the aperture 3, vents 31 and window opening 2.

When the cover 5 is returned from the tilted-up position to the closed position, the lever 36 is freed from the pressure of the free end of the drive cable 28, causing the spring 42 to return the closures 32 to the closed position.

To operate the closures 32 manually, the handle 41 is rotated. Since handle 41 is connected to the closure drive cable 39 by the coupling means, rotation thereof moves the drive cable 39 into engagement with the operating portion 38, thereby causing the lever 36 and the link 35 to bring the closures 32 to their opened position in the same manner as indicated above. Similarly the closures 32 are closable by rotating the handle 41 in an opposite direction. Alternatively, the entire sunshade panel may be displaced via knob 6a in the same manner noted relative to the first embodiment.

Figure 14:
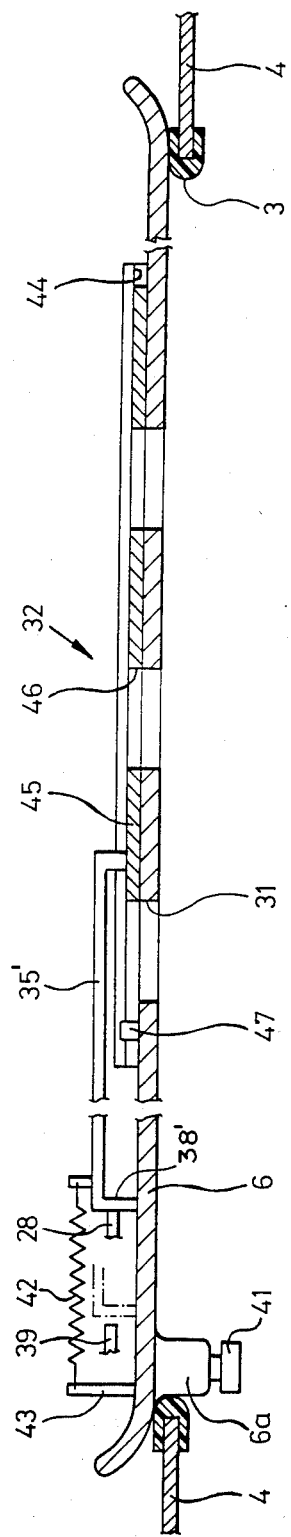
FIG. 14 is a fragmentary longitudinal sectional view showing a third embodiment in accordance with the present invention.

FIG. 14 shows a third embodiment of the present invention. A closure 32 in the form of a single plate is fitted in guide grooves 44 at opposite sides of the sunshade panel 6 and is slidable forward or rearward. The closure 32 has closing portions 45 for closing the vents 31, and openings 46 adapted to communicate with the vents 31, the portions 45 and openings 46 being arranged side by side alternately longitudinally of the closure. When the closure 32 is slidingly moved forward or rearward, the vents 31 are opened or closed by portions 45 of the closure 32. A longitudinally extending link 35', extends forward from the closure member 32, has a front end operating portion 38', against which the ends of the drive cables 28 and closure drive cable 39 can abut, as in the second embodiment, for both automatic and manual operation. Indicated at 47 is a stop for limiting movement of the closure 32 when it is returned to its closed position via return spring 42.

According to the present invention described in detail above, panel means for an aperture in a frame located below a roof opening is operatively associated with drive cables to partially open the aperture when a cover for the roof opening is in a tilted-up position, so that even when the aperture is closed by the panel means, the interior of the vehicle can be ventilated merely by tilting up the cover without the necessity of separately moving the opening means and is, hence very convenient. Further, the arrangement where the drive cables are operatively connected to the panel means, as above, eliminates the likelihood that the driver will forget to close the window opening with the cover. Additionally, since there are no direct interconnections between the cover and/or the drive and the inner sunshade panel, the sunshade panel may also be displaceable to various positions opening the aperture independent of the position of the cover. The present invention has these various advantages, is simple in construction, can be practiced at a low cost and is very useful.

While we have shown and describe various embodiments in accordance with the present invention, it is understood that the same is not limited thereto, but is susceptible of numerous changes and modifications as known to those skilled in the art, and we, therefore, do not wish to be limited to the details shown and described herein, but intend to cover all such changes and modifications as are encompassed by the scope of the appended claims.

We claim:

1. A ventilating device for a roof opening of a vehicle, comprising a pair of guide rails provided at opposite sides of the roof opening, a cover mounted on the guide rails by slide members and slidingly movable forward or backward for opening or closing the roof opening, drive means for slidingly moving the slide members through displacement of a pair of drive cables, a tilting assembly provided between the cover and the slide members and operable by the sliding movement of the slide members to tilt the cover from a position closing the roof opening to a tilted-up position by tilting up the cover about a front portion thereof, a frame provided under the roof, and an aperture formed in the frame at a location under the roof opening that is openable or closable by panel means, wherein the drive cables operatively directly interact with the panel means in a manner forming a means for sliding the panel means to partially open the aperture during the tilting up movement of the cover.

2. A ventilating device for a roof opening of a vehicle, comprising a pair of guide rails provided at opposite sides of the roof opening, a cover mounted on the guide rails by slide members and slidingly movable forward or backward for opening or closing the roof opening, drive means for slidingly moving the slide members through displacement of a pair of drive cables, a tilting assembly provided between the cover and the slide members and operable by the sliding movement of the slide members to shift the cover from a position closing the roof opening to a tilted-up position by tilting up the cover about a front portion thereof, a frame provided under the roof, and an aperture formed in the frame at a location under the roof opening that is openable or closable by panel means, wherein the drive cables are operably associated with the panel means in a manner partially opening the aperture when the cover is in said tilted-up position, wherein said panel means is provided with entrainment means positioned on said panel means at a location within the path of movement of the drive cables so as to be engaged by an end portion of the drive cables, said entrainment means and the end portion of the drive cables thereby forming a means for shifting of at least a part of said panel means in response to displacement of said cover from the closing position to said tilted-up position.

3. A ventilating device according to claim 2, wherein the entrainment means are operable for preventing manual closing of said panel means when said cover is in said tilted-up position.

4. A ventilating device according to claim 2, wherein the panel means is provided with a plurality of auxiliary slide members upon which the panel means is slidably displaceable, and wherein the entrainment means comprise foremost ones of said said auxiliary slide members upon which said panel means is slidably displaceable.

5. A ventilating device according to claim 4, wherein free ends of said drive cables a positioned in front of the foremost auxiliary slide members for abutting engagement thereof when the drive cables are displaced by the drive means.

6. A ventilating device according to claim 5, wherein the entrainment means are operable for preventing manual closing of said panel means when said cover is in said tilted-up position.

7. A ventilating device according to claim 2, wherein said panel means comprises a panel provided with a plurality of vents therethrough and closure means by which said vents are openable and closable, said closure means being coupled to said entrainment means.

8. A ventilating device according to claim 7, wherein the closure means comprises a plurality of closures that are pivotally connected to the panel.

9. A ventilating device according to claim 8, wherein said entrainment means comprises a lever swingably mounted upon the panel.

10. A ventilating device according to claim 9, further comprising return spring means for biasing said lever to a position shifting said closures so as to close said vents.

11. A ventilating device according to claim 7, wherein said closure means comprises a closure plate that is provided with openings that are alignable with said vents and is slidably mounted on said panel.

12. A ventilating device according to claim 11, wherein said entrainment means comprises a link having a front end operating portion positioned in opposition to free ends of said drive cables.

13. A ventilating device according to claim 12, wherein return spring means is provided for biasing said link to a position shifting the closure plate so as to close said vent openings.

14. A ventilating device according to claim 13, further comprising stop means for stopping the sliding movement of said closure plate when the closure plate is returned to a position closing the vents by said return spring means.

15. A ventilating device according to claim 11, wherein return spring means is provided for biasing said link to a position shifting the closure plate so as to close said vent openings.

16. In a ventilating device for a roof opening of a vehicle of the type having a cover mounted for closing the roof opening, means for displacing the cover from a position closing the roof opening to positions for opening the roof opening by sliding movement and for opening the roof opening by tilting movement and panel means mounted under said cover for closing an aperture disposed under said roof opening, the improvement wherein means for automatically shifting at least a portion of the panel means from a position wherein said aperture is closed to a position wherein said aperture is closed to a position partially opening the aperture during said tilting movement of the cover is provided, and wherein at least a portion of the panel means is also displaceable to positions opening said aperture when said cover is closed and further opening said aperture when said cover is tilted up independent of the position of said cover.

17. In a ventilating device according to claim 16, wherein the positions to which the panel means is independently displaceable include a position wherein the aperture is fully open.

18. In a ventilating device according to claim 16, wherein the independent displacement of the panel means is manually obtainable.

19. In a ventilating device according to claim 18, wherein the manually obtainable displacement is achievable by direct manipulation of a portion of the panel means.

20. In a ventilating device according to claim 16, wherein the independent displaceability of the panel means to positions opening the aperture includes displacement of the entire panel means.

21. A ventilating device for a roof opening of a vehicle having a cover mounted for closing the roof opening, means for opening the roof opening by upward tilting movement of the cover, a panel mounted under said cover for sliding movement relative to the cover in a longitudinal direction of the vehicle and for closing, in a forward end position thereof, an aperture disposed under said roof opening, and means for automatically rearwardly sliding the panel from a position wherein said aperture is closed to a position partially opening the aperture during said upward tilting movement of the cover.

22. In a ventilating device according to claim 21, wherein the mounting of the panel for sliding movement in a longitudinal direction also enables said panel to be displaceable to positions opening the roof opening independent of the position of the cover.

* * * * *